United States Patent
Du et al.

(10) Patent No.: US 11,044,110 B2
(45) Date of Patent: Jun. 22, 2021

(54) SMS-BASED VOWIFI CONFIGURATION METHOD, AND TERMINAL DEVICE

(71) Applicant: JRD Communication (Shenzhen) LTD., Shenzhen (CN)

(72) Inventors: Kai Du, Shenzhen (CN); Lina Yang, Shenzhen (CN); Tao Li, Shenzhen (CN); Ruihua Zhang, Shenzhen (CN); Shifeng Cao, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 16/769,587

(22) PCT Filed: Dec. 4, 2018

(86) PCT No.: PCT/CN2018/119042
§ 371 (c)(1),
(2) Date: Jun. 4, 2020

(87) PCT Pub. No.: WO2019/109897
PCT Pub. Date: Jun. 13, 2019

(65) Prior Publication Data
US 2020/0313914 A1    Oct. 1, 2020

(30) Foreign Application Priority Data
Dec. 4, 2017 (CN) .......................... 201711259356.7

(51) Int. Cl.
*H04W 88/06* (2009.01)
*H04L 12/12* (2006.01)
(Continued)

(52) U.S. Cl.
CPC ............... *H04L 12/12* (2013.01); *H04W 4/14* (2013.01); *H04W 60/00* (2013.01); *H04W 84/12* (2013.01)

(58) Field of Classification Search
CPC ......... H04L 29/06; H04L 29/12; H04L 12/12; H04L 12/721; H04L 9/32; H04L 12/14;
(Continued)

(56) References Cited

U.S. PATENT DOCUMENTS

2012/0122451 A1    5/2012  Jiang
2014/0286308 A1    9/2014  Lee et al.
(Continued)

FOREIGN PATENT DOCUMENTS

CN    1975456       6/2007
CN    106375970     2/2017
(Continued)

OTHER PUBLICATIONS

International Search Report and the Written Opinion dated Feb. 28, 2019 From the International Searching Authority Re. Application No. PCT/CN2018/119042 and Its Translation of Search Report Into English. (10 Pages).

*Primary Examiner* — Quan M Hua

(57) ABSTRACT

An SMS-based VoWIFI configuration method comprises: when an SMS of a VoWIFI type is received, extracting a configuration identifier carried by the SMS, and determining the type of the configuration identifier; and when the configuration identifier is an enable identifier, extracting EPDG information carried by the SMS, and registering an IMS service according to the EPDG information, so as to enable a VoWIFI function.

16 Claims, 1 Drawing Sheet

(51) Int. Cl.
*H04W 4/14* (2009.01)
*H04W 60/00* (2009.01)
*H04W 84/12* (2009.01)

(58) Field of Classification Search
CPC ...... H04L 12/707; H04L 29/08; H04W 48/18; H04W 36/14; H04W 76/10; H04W 4/90; H04W 48/14; H04W 84/04; H04W 48/16; H04W 4/00; H04W 4/50; H04W 88/06; H04W 36/00; H04W 36/30; H04W 88/16; H04W 36/36; H04W 76/16; H04W 36/16; H04W 36/32; H04W 4/06; H04W 4/14; H04W 40/12; H04W 60/00; H04W 76/22; H04W 8/02; H04W 8/18; H04W 24/04; H04W 36/24; H04W 68/02; H04W 72/02; H04W 72/04; H04W 76/27; H04W 8/12; H04W 36/38

See application file for complete search history.

(56) References Cited

U.S. PATENT DOCUMENTS

| 2015/0350983 | A1* | 12/2015 | Kwok ................ H04L 65/1016 370/331 |
| 2016/0271800 | A1 | 9/2016 | Stubbs et al. |
| 2017/0135031 | A1* | 5/2017 | Buckley .............. H04L 61/2015 |
| 2018/0091967 | A1* | 3/2018 | Gupta ................... H04W 48/14 |
| 2019/0124559 | A1 | 4/2019 | Brown et al. |

FOREIGN PATENT DOCUMENTS

| CN | 106686589 | 5/2017 |
| CN | 106911688 | 6/2017 |
| CN | 106973369 | 7/2017 |
| CN | 108134678 | 6/2018 |
| EP | 2484132 | 4/2017 |
| WO | WO 2017/167694 | 10/2017 |
| WO | WO 2019/109897 | 6/2019 |

* cited by examiner

SMS-BASED VOWIFI CONFIGURATION METHOD, AND TERMINAL DEVICE

RELATED APPLICATIONS

This application is a National Phase of PCT Patent Application No. PCT/CN2018/119042 having International filing date of Dec. 4, 2018, which claims the benefit of priority of Chinese Patent Application No. 201711259356.7 filed on Dec. 4, 2017. The contents of the above applications are all incorporated by reference as if fully set forth herein in their entirety.

FIELD AND BACKGROUND OF THE INVENTION

The present invention relates to a smart terminal technique, and more particularly, to a VoWiFi arrangement method based on SMS and a terminal device.

Currently, the service providers are in the initial stage for supporting the VoWiFi services. Some service providers need to determine to rearrange the VoWiFi function of the mobile terminal through the network. VoWiFi could reduce the mobile network load of the service providers. However, when the user or the service provider needs to turn on/off the VoWiFi, the system on the terminal device should be upgraded to control the on/off state of the VoWiFi function. But, the upgrading process may introduce unpredictable risks to the terminal device. In addition, it takes a lot of time for the terminal device to upgrade the system. This increases the time for turning on/off the VoWiFi function.

SUMMARY OF THE INVENTION

One objective of an embodiment of the present invention is to provide a VoWiFi arrangement method based on SMS and a terminal device, to reduce the risk of the terminal device introduced by turning on/off the VoWiFi.

According to a first aspect of an embodiment of the present invention, a voice-over WiFi (VoWiFi) based on short message service (SMS) arrangement method is disclosed. The VoWiFi arrangement method comprises: when receiving a SMS of a VoWiFi type, obtaining an arrangement identification carried by the SMS and determining a type of the arrangement identification; and when the arrangement identification is a turn-on identification, obtaining EPDG information carried by the SMS and registering an IMS service according to the EPDG information to turn on a VoWiFi function.

According to the VoWiFi arrangement method, the step of obtaining the EPDG information carried by the SMS and registering the IMS service according to the EPDG information to turn on the VoWiFi function when the arrangement identification is the turn-on identification comprises: when the arrangement identification is the turn-on identification, obtaining the EPDG information carried by the SMS and determining the EPDG information type; and when the EPDG information is an IP address, registering the IMS service corresponding to the IP address to turn on the VoWiFi function.

According to the VoWiFi arrangement method, the step of obtaining the EPDG information carried by the SMS and registering the IMS service according to the EPDG information to turn on the VoWiFi function when the arrangement identification is the turn-on identification further comprises: when the EPDG information is an FQDN, performing a domain name analysis on the FQDN to obtain the IP address of the EPDG information; and registering the IMS service corresponding to the IP address to turn on the VoWiFi function.

According to the VoWiFi arrangement method, the step of obtaining the EPDG information carried by the SMS and determining the EPDG information type when the arrangement identification is the turn-on identification comprises: when the arrangement identification is the turn-on identification, displaying the indication information of turning on VoWiFi on a display interface to inquire a user whether to turn on the VoWiFi; and when receiving a control command for turning on VoWiFi from a user, obtaining the EPDG information carried by the SMS and determining the EPDG information type.

According to the VoWiFi arrangement method, the VoWiFi arrangement method further comprises: storing the EPDG information in a predetermined VoWiFi arrangement table and adding an operation interface of the VoWiFi function into a corresponding user interface after the step of obtaining the EPDG information carried by the SMS and registering the IMS service according to the EPDG information to turn on the VoWiFi function when the arrangement identification is the turn-on identification.

According to the VoWiFi arrangement method, the VoWiFi arrangement method further comprises: turning off the VoWiFi function when the arrangement identification is a turn-off identification.

According to the VoWiFi arrangement method, the step of turning off the VoWiFi function when the arrangement identification is the turn-off identification comprises: when the arrangement identification is the turn-off identification, turning off the VoWiFi function and cancelling the IMS service.

According to the VoWiFi arrangement method, the VoWiFi arrangement method further comprises: deleting an operation interface corresponding the VoWiFi function from a corresponding user interface after the step of turning off the VoWiFi function when the arrangement identification is the turn-off identification.

According to a second aspect of an embodiment of the present invention, an arrangement method based on a short message service is disclosed. The method comprises: when receiving a short message, determining whether a type of the short message is a predetermined type; if the type of the short message is the predetermined type, obtaining a predetermined information carried by the short message and detecting whether a predetermined data base stores the predetermined information; and if the data base does not store the predetermined information, registering an IMS service according to the predetermined information to turn on a VoWiFi function.

According to the arrangement method, the arrangement method further comprises: when the predetermined information is a FQDN, performing a domain analysis on the FQDN to obtain an IP address of the predetermined information; and registering the IMS service according to the IP address to turn on the VoWiFi function.

According to the arrangement method, the arrangement method further comprises: storing the predetermined information in a predetermined VoWiFi table and adding an operation interface of the VoWiFi function into a corresponding user interface after the step of registering an IMS service according to the predetermined information to turn on a VoWiFi function if the data base does not store the predetermined information.

According to the arrangement method, the predetermined information type is the EPDG information.

According to a third aspect of an embodiment of the present invention, a terminal device is disclosed. The terminal device comprises: a storage device, configured to store a computer readable program; a bus; and a processor, configured to execute the computer readable program to perform operations of: when receiving a SMS of a VoWiFi type, obtaining an arrangement identification carried by the SMS and determining a type of the arrangement identification; and when the arrangement identification is a turn-on identification, obtaining EPDG information carried by the SMS and registering an IMS service according to the EPDG information to turn on a VoWiFi function.

According to the terminal device, the processor is configured to execute the computer readable program to perform operations of: when the arrangement identification is the turn-on identification, obtaining the EPDG information carried by the SMS and determining the EPDG information type; and when the EPDG information is an IP address, registering the IMS service corresponding to the IP address to turn on the VoWiFi function.

According to the terminal device, when the operation of obtaining the EPDG information carried by the SMS and registering the IMS service according to the EPDG information to turn on the VoWiFi function when the arrangement identification is the turn-on identification is performed, the processor is configured to execute the computer readable program to perform operations of: when the EPDG information is an FQDN, performing a domain name analysis on the FQDN to obtain the IP address of the EPDG information; and registering the IMS service corresponding to the IP address to turn on the VoWiFi function.

According to the terminal device, when the operation of obtaining the EPDG information carried by the SMS and determining the EPDG information type when the arrangement identification is the turn-on identification is performed, the processor is configured to execute the computer readable program to perform operations of: when the arrangement identification is the turn-on identification, displaying the indication information of turning on VoWiFi on a display interface to inquire a user whether to turn on the VoWiFi; and when receiving a control command for turning on VoWiFi from a user, obtaining the EPDG information carried by the SMS and determining the EPDG information type.

According to the terminal device, the processor is configured to execute the computer readable program to perform an operation of: storing the EPDG information in a predetermined VoWiFi arrangement table and adding an operation interface of the VoWiFi function into a corresponding user interface after the operation of obtaining the EPDG information carried by the SMS and registering the IMS service according to the EPDG information to turn on the VoWiFi function when the arrangement identification is the turn-on identification.

According to the terminal device, the processor is configured to execute the computer readable program to perform an operation of: turning off the VoWiFi function when the arrangement identification is a turn-off identification.

According to the terminal device, when the operation of turning off the VoWiFi function when the arrangement identification is the turn-off identification is performed, the processor is configured to execute the computer readable program to perform an operation of: when the arrangement identification is the turn-off identification, turning off the VoWiFi function and cancelling the IMS service.

According to the terminal device, the processor is configured to execute the computer readable program to perform an operation of: deleting an operation interface corresponding the VoWiFi function from a corresponding user interface after the operation of turning off the VoWiFi function when the arrangement identification is the turn-off identification.

The present invention provides a VoWiFi arrangement method based on SMS and a terminal device. The arrangement method comprises: when receiving a SMS of a VoWiFi type, obtaining an arrangement identification carried by the SMS and determining a type of the arrangement identification; and when the arrangement identification is a turn-on identification, obtaining EPDG information carried by the SMS and registering an IMS service according to the EPDG information to turn on a VoWiFi function. The present invention controls the terminal device to turn on/off the VoWiFi function according to the arrangement identification and EPDG information carried by the SMS information. This reduces the time for turning on/off the VoWiFi function and reduces the risks introduced by turning on/off the VoWiFi function.

DETAILED DESCRIPTION OF PREFERRED SPECIFIC EMBODIMENTS OF THE INVENTION

Figure 1:
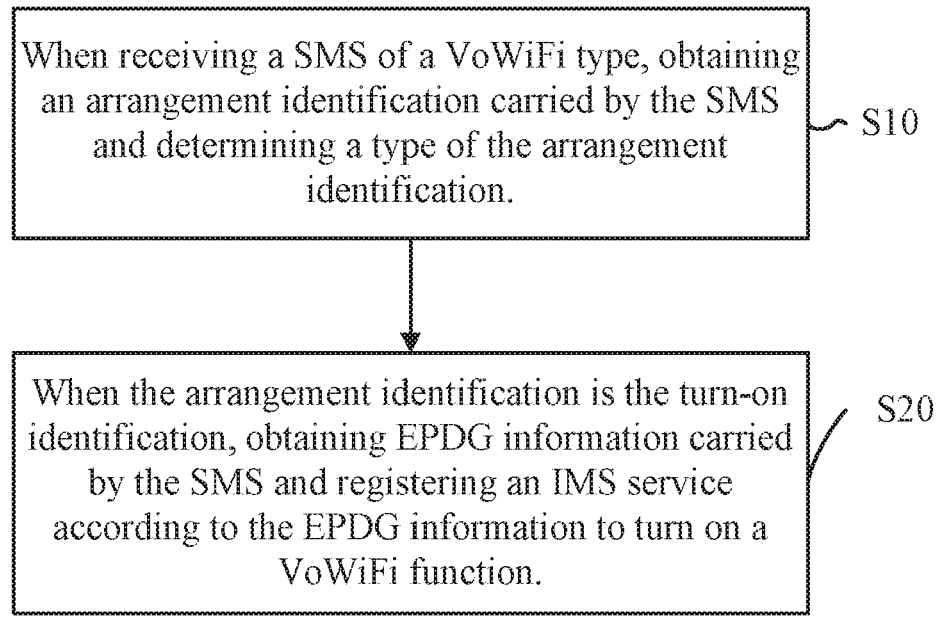
FIG. 1 is a flow chart of a VoWiFi arrangement method based on SMS according to an embodiment of the present invention.

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Specifically, the terminologies in the embodiments of the present invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood that the terminology used herein that "and/or" means and includes any or all possible combinations of one or more of the associated listed items. It should be understood that, when an element or layer is referred to herein as being "disposed on", "connected to" or "coupled to" another element or layer, it can be directly disposed on, connected or coupled to the other element or layer, or alternatively, that intervening elements or layers may be present. In contrast, when an element is referred to as being "directly disposed on," "directly connected to" or "directly coupled to" another element or layer, there are no intervening elements or layers present. In the figures, like numbers refer to like elements throughout. As used herein, the term "and/or" includes any and all combinations of one or more of the associated listed items.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

The invention is described below in detail with reference to the accompanying drawings, wherein like reference numerals are used to identify like elements illustrated in one or more of the figures thereof, and in which exemplary embodiments of the invention are shown.

Please refer to FIG. 1. FIG. 1 is a flow chart of a VoWiFi arrangement method based on SMS according to an embodiment of the present invention. The method comprises:

S10: when receiving a SMS of a VoWiFi type, obtaining an arrangement identification carried by the SMS and determining a type of the arrangement identification.

SMS represents the short message service, which is a text message service of a phone service, a web service, or a mobile phone service. The SMS uses a standard communication protocol, which allows a land line or a mobile phone to transmit text messages. Accordingly, the above-mentioned step of receiving a SMS of the VoWiFi type represents that receiving a SMS and the type of the SMS is the VoWiFi type. Correspondingly, the terminal device could pre-store the identification of the VoWiFi type. In this way, when receiving the SMS, the terminal device could determine whether the SMS is the VoWiFi type according to its identification. Here, the identification could be preset and sent to the terminal device by the service provider. When the service provider sends the SMS of VoWiFi type, the SMS carries the identification such that the terminal device could determine whether the SMS is the VoWiFi type according to the identification.

The SMS carries the arrangement information. The arrangement information comprises at least an arrangement identification and a Evolved Packet Data Gateway (EPDG) information. The arrangement identification is used to determine to turn on or turn off the VoWiFi function. The EPDG information comprises the IP address of the EPDG or the fully qualified domain name (FQDN). In this way, a control commend corresponding to the SMS could be determined according to the arrangement identification. The control command comprises a turn-on command and a turn-off command. According to the type of the arrangement identification, it could determine the control command is a turn-on identification or a turn-off identification.

S20: when the arrangement identification is the turn-on identification, obtaining EPDG information carried by the SMS and registering an IMS service according to the EPDG information to turn on a VoWiFi function.

In the following disclosure, the arrangement identification is the turn-on identification. This is to illustrate that the SMS is a control command used to control the terminal device to turn on VoWiFi to further obtain the EPDG information carried by the SMS. Surely, when obtaining the EPDG information, the terminal device could detect whether the database stores the EPDG information. If yes, then it represents that the VoWiFi had been turned on and thus the EPDG information is discarded and the related process is ended. If not, then the terminal device registers the IMS service to turn on the VoWiFi function.

The step of obtaining EPDG information carried by the SMS and registering an IMS service according to the EPDG information to turn on the VoWiFi function when the arrangement identification is the turn-on identification comprises:

S21: when the arrangement identification is the turn-on identification, obtaining the EPDG information carried by the SMS and determining the EPDG information type.

S22: when the EPDG information is an IP address, registering the IMS service corresponding to the IP address to turn on the VoWiFi function.

S23: when the EPDG information is an FQDN, performing a domain name analysis on the FQDN to obtain the IP address of the EPDG information.

S24: registering the IMS service corresponding to the IP address to turn on the VoWiFi function.

The EPDG information could be the IP address or FQDN of the EPDG. Therefore, when obtaining the EPDG information carried by the EMS, the terminal device determines the EPDG information type. That is, the terminal device determines whether the EPDG information is the IP address or FQDN and perform different operations according to the EPDG information type to register the IMS service through the EPDG.

In addition, when the arrangement identification is determined as the turn-on identification, it needs to inquire the user whether to turn on the VoWiFi function. When the user agrees to turn on the VoWiFi function, the EPDG information carried by the SMS is obtained. The step of obtaining the EPDG information carried by the SMS and determining the EPDG information type when the arrangement identification is the turn-on identification comprises:

S211: when the arrangement identification is the turn-on identification, displaying the indication information of turning on VoWiFi on a display interface to inquire a user whether to turn on the VoWiFi.

S222: when receiving a control command for turning on VoWiFi from a user, obtaining the EPDG information carried by the SMS and determining the EPDG information type.

The display interface could be a pop-up window or a floating frame to display the indication information. Here, the indication information could be a selection button containing "yes" and "no" with the indication language. For example, the indication information could include a language "whether to turn on the VoWiFi" with a selection button "yes" and "no". The user could push the selection button to input a control command and the terminal device could perform the corresponding operation according to the control command. Specifically, if the selection button "yes" is pushed, it means that the user input the control command for turning on the VoWiFi. Thus the EPDG information carried by the SMS is obtained and the EPDG information type is determined. On the other hand, if the selection button "no" is pushed, it presents that the user inputs the control command for not turning on the VoWiFi and thus the SMS is discarded. In addition, if the user does not input any control command for a predetermined time period, this operation will be deemed as a default operation for a control command and a corresponding operation is performed. Here, the default operation could be preset by the user. For example, the default operation could be equal to push the selection button "yes" and the corresponding operation is performed. The predetermined time period could be preset by the user as well or a default time, such as 30 seconds.

After turning on the VoWiFi function, in order to be easy for the user to use the VoWiFi function, the operation interface/identification of the VoWiFi function could be added in the user interface and displayed in the user interface of the terminal device. For example, the dialing interface could further display the VoWiFi button and the setting interface could display a switch of the VoWiFi. That is, after the step of obtaining the EPDG information carried by the SMS and registering the IMS service according to the EPDG information to turn on the VoWiFi function when the arrangement identification is the turn-on identification, the method further comprises a step of storing the EPDG information in a predetermined VoWiFi arrangement table and adding an operation interface of the VoWiFi function into a corresponding user interface.

Then, the EPDG information obtained from the SMS is stored in the predetermined database and the database could store VoWiFi related data of other users. In this way, when the terminal device searches for the EPDG information in the predetermined database, the terminal device needs to determine whether the searched EPDG information belongs to the terminal device. In addition, the predetermined database stores the VoWiFi related data of other users and thus the EPDG information carried by the SMS could be examined through the VoWiFi related data of other users such that the accuracy of the EPDG information could be raised. The convenience for turning on the VoWiFi function according to the SMS could be improved as well.

In an embodiment of the present invention, the VoWiFi arrangement method based on SMS of the above-mentioned embodiments could further comprise:

S30: turning off the VoWiFi function when the arrangement identification is a turn-off identification.

Specifically, when the arrangement identification is the turn-off identification, the present invention could detect whether the terminal device had turned on the VoWiFi function. If the VoWiFi function had been turned on, the present invention could turn off the VoWiFi function. If then the VoWiFi function has not turned on, then the SMS is discarded. In addition, the user needs to approve the turning-off operation before the VoWiFi function is turned off. That is, the step of turning off the VoWiFi function when the arrangement identification is a turn-off identification comprises:

S31: when the arrangement identification is the turn-off identification, displaying the indication information for turning off the VoWiFi function on the display interface to inquire the user whether to turn off the VoWiFi.

S32: when receiving the control command for turning off the VoWiFi function from the user, turning off the VoWiFi function and cancelling the IMS service.

Here, the indication information for turning off the VoWiFi function could comprise "yes" and "no" selection buttons with indication language of the corresponding operation. For example, the language "whether to turn off the VoWiFi function" with the selection buttons "yes" and "no" could be shown. Then, the user pushes the button "yes" or "no" to input the control command and the corresponding operation is performed according to the control command. This operation is similar to the above-mentioned operation for turning on the VoWiFi function and further illustration is omitted here.

Furthermore, when the arrangement identification is the turn-off identification, the present invention could delete the operation interface corresponding the VoWiFi function from the corresponding user interface after the step of turning off the VoWiFi function. Or, the present invention could search for the EPDG information carried by the SMS in the predetermined database and delete the searched EPDG information.

Based on the above-mentioned VoWiFi arrangement method base on SMS, a computer readable medium is disclosed. The computer readable medium could store one or more programs. The one or more programs could be executed by one or more processors to implement the above-mentioned VoWiFi arrangement method base on SMS.

Figure 2:
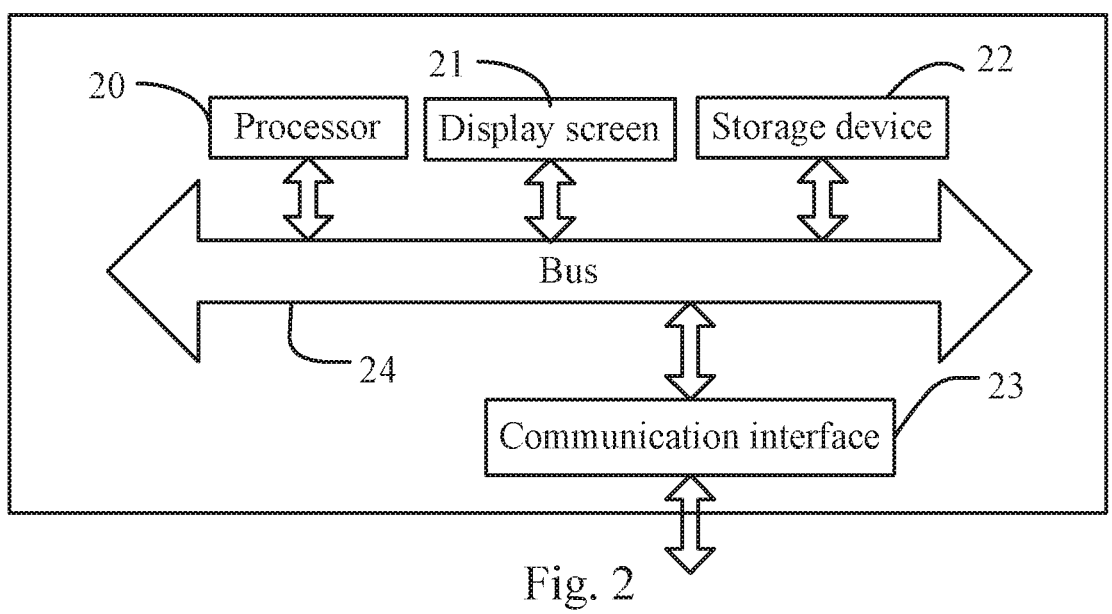
FIG. 2 is a diagram of a terminal device according to an embodiment of the present invention.

In addition, a terminal device is disclosed. As shown in FIG. 2, the terminal device comprises at least one processor 20; a display panel 21; a memory 22, a communication interface 23 and a bus 24. Here, the processor 20, the display panel, 21, the memory 22, and the communication interface 23 could communicate with each other through the bus 24. The display panel 21 could display a predetermined user guiding interface in an initial setting mode. The communication interface 23 could transfer information. The processor 20 could execute the logic commands stored in the memory 22 to perform the above-mentioned method.

The logic commands stored in the memory 22 could be realized as a software program as an independent product for sale or use, which can be stored in a computer readable medium.

The memory 22, as a computer readable medium, can store a storage software program and a computer executable program, such as the process commands or modules corresponding to the above-mentioned method. The processor 30 executes the program codes, commands or modules stored in the memory 22 to perform corresponding functions or data processing to perform the above-mentioned method.

The memory 22 could comprise an area for storing programs and an area for storing data. Here, the area for storing programs could store an operation system and at least one application program for a function. The area for storing data could store the data created for the terminal device to use. Furthermore, the memory 22 could comprise a high speed RAM or a non-volatile memory, such as USB drive, a ROM, a RAM, a mobile hard drive, a disk, an optical disk or any other medium that could store programs. Also, the memory 22 could be a temporary storage medium.

In addition, the related operations that the processor executing the programs in the memory had been illustrated in the above. Further illustration is omitted here.

Above are embodiments of the present invention, which does not limit the scope of the present invention. Any modifications, equivalent replacements or improvements within the spirit and principles of the embodiment described above should be covered by the protected scope of the invention.

What is claimed is:
1. A voice-over WiFi (VoWiFi) based on short message service (SMS) arrangement method, the VoWiFi arrangement method comprising:
when receiving a SMS of a VoWiFi type, obtaining an arrangement identification carried by the SMS and determining a type of the arrangement identification; and
when the arrangement identification is a turn-on identification, obtaining EPDG information carried by the

SMS and registering an IMS service according to the EPDG information to turn on a VoWiFi function.

2. The VoWiFi arrangement method of claim 1, wherein the step of obtaining the EPDG information carried by the SMS and registering the IMS service according to the EPDG information to turn on the VoWiFi function when the arrangement identification is the turn-on identification comprises:

when the arrangement identification is the turn-on identification, obtaining the EPDG information carried by the SMS and determining the EPDG information type; and when the EPDG information is an IP address, registering the IMS service corresponding to the IP address to turn on the VoWiFi function.

3. The VoWiFi arrangement method of claim 2, wherein the step of obtaining the EPDG information carried by the SMS and registering the IMS service according to the EPDG information to turn on the VoWiFi function when the arrangement identification is the turn-on identification further comprises:

when the EPDG information is an FQDN, performing a domain name analysis on the FQDN to obtain the IP address of the EPDG information; and registering the IMS service corresponding to the IP address to turn on the VoWiFi function.

4. The VoWiFi arrangement method of claim 2, wherein the step of obtaining the EPDG information carried by the SMS and determining the EPDG information type when the arrangement identification is the turn-on identification comprises:

when the arrangement identification is the turn-on identification, displaying the indication information of turning on VoWiFi on a display interface to inquire a user whether to turn on the VoWiFi; and when receiving a control command for turning on VoWiFi from a user, obtaining the EPDG information carried by the SMS and determining the EPDG information type.

5. The VoWiFi arrangement method of claim 1, further comprising:

storing the EPDG information in a predetermined VoWiFi arrangement table and adding an operation interface of the VoWiFi function into a corresponding user interface after the step of obtaining the EPDG information carried by the SMS and registering the IMS service according to the EPDG information to turn on the VoWiFi function when the arrangement identification is the turn-on identification.

6. The VoWiFi arrangement method of claim 1, further comprising:

turning off the VoWiFi function when the arrangement identification is a turn-off identification.

7. The VoWiFi arrangement method of claim 6, wherein the step of turning off the VoWiFi function when the arrangement identification is the turn-off identification comprises:

when the arrangement identification is the turn-off identification, turning off the VoWiFi function and cancelling the IMS service.

8. The VoWiFi arrangement method of claim 6, further comprising:

deleting an operation interface corresponding the VoWiFi function from a corresponding user interface after the step of turning off the VoWiFi function when the arrangement identification is the turn-off identification.

9. A terminal device, comprising:
a storage device, configured to store a computer readable program;
a bus; and
a processor, configured to execute the computer readable program to perform operations of:
when receiving a SMS of a VoWiFi type, obtaining an arrangement identification carried by the SMS and determining a type of the arrangement identification; and
when the arrangement identification is a turn-on identification, obtaining EPDG information carried by the SMS and registering an IMS service according to the EPDG information to turn on a VoWiFi function.

10. The terminal device of claim 9, wherein the processor is configured to execute the computer readable program to perform operations of:

when the arrangement identification is the turn-on identification, obtaining the EPDG information carried by the SMS and determining the EPDG information type; and when the EPDG information is an IP address, registering the IMS service corresponding to the IP address to turn on the VoWiFi function.

11. The terminal device of claim 10, wherein when the operation of obtaining the EPDG information carried by the SMS and registering the IMS service according to the EPDG information to turn on the VoWiFi function when the arrangement identification is the turn-on identification is performed, the processor is configured to execute the computer readable program to perform operations of:

when the EPDG information is an FQDN, performing a domain name analysis on the FQDN to obtain the IP address of the EPDG information; and registering the IMS service corresponding to the IP address to turn on the VoWiFi function.

12. The terminal device of claim 11, wherein when the operation of obtaining the EPDG information carried by the SMS and determining the EPDG information type when the arrangement identification is the turn-on identification is performed, the processor is configured to execute the computer readable program to perform operations of:

when the arrangement identification is the turn-on identification, displaying the indication information of turning on VoWiFi on a display interface to inquire a user whether to turn on the VoWiFi; and when receiving a control command for turning on VoWiFi from a user, obtaining the EPDG information carried by the SMS and determining the EPDG information type.

13. The terminal device of claim 9, wherein the processor is configured to execute the computer readable program to perform an operation of:

storing the EPDG information in a predetermined VoWiFi arrangement table and adding an operation interface of the VoWiFi function into a corresponding user interface after the operation of obtaining the EPDG information carried by the SMS and registering the IMS service according to the EPDG information to turn on the VoWiFi function when the arrangement identification is the turn-on identification.

14. The terminal device of claim 9, wherein the processor is configured to execute the computer readable program to perform an operation of:

turning off the VoWiFi function when the arrangement identification is a turn-off identification.

15. The terminal device of claim 14, wherein when the operation of turning off the VoWiFi function when the arrangement identification is the turn-off identification is performed, the processor is configured to execute the computer readable program to perform an operation of:
  when the arrangement identification is the turn-off identification, turning off the VoWiFi function and cancelling the IMS service.

16. The terminal device of claim 15, wherein the processor is configured to execute the computer readable program to perform an operation of:
  deleting an operation interface corresponding the VoWiFi function from a corresponding user interface after the operation of turning off the VoWiFi function when the arrangement identification is the turn-off identification.

* * * * *